United States Patent [19]

Stoll

[11] Patent Number: 4,896,700

[45] Date of Patent: Jan. 30, 1990

[54] VALVE ARRAY

[75] Inventor: Kurt Stoll, Esslingen, Fed. Rep. of Germany

[73] Assignee: Festo KG, Esslingen, Fed. Rep. of Germany

[21] Appl. No.: 316,469

[22] Filed: Feb. 27, 1989

Related U.S. Application Data

[63] Continuation of Ser. No. 124,380, Nov. 24, 1987, abandoned, which is a continuation of Ser. No. 885,942, Jul. 15, 1986, abandoned.

[30] Foreign Application Priority Data

Jul. 19, 1985 [DE] Fed. Rep. of Germany ....... 3525857

[51] Int. Cl.[4] .............................................. F16K 11/00
[52] U.S. Cl. .................................. 137/884; 285/137.1
[58] Field of Search .................. 137/271, 596.17, 884; 285/137.1

[56] References Cited

U.S. PATENT DOCUMENTS

| | | | |
|---|---|---|---|
| 3,107,694 | 10/1963 | Kastings | 137/271 X |
| 3,698,432 | 10/1972 | Kurtz | 137/884 |
| 3,747,632 | 7/1973 | Koh et al. | 285/137.1 X |
| 4,095,863 | 6/1978 | Hardin | 137/884 X |
| 4,399,836 | 8/1983 | de Versterre et al. | 137/884 X |
| 4,493,340 | 1/1985 | Weirich | 285/137.1 X |
| 4,498,693 | 2/1985 | Schindele | 285/137.1 |
| 4,507,707 | 3/1985 | Willis | 137/884 X |
| 4,527,589 | 7/1985 | Stoll | 137/884 X |
| 4,549,248 | 10/1985 | Stoll | 137/884 X |

Primary Examiner—John Fox
Attorney, Agent, or Firm—McGlew & Tuttle

[57] ABSTRACT

It is a question of a valve array with a number of electrically operated valves which are placed on a mounting face, common to all of them, of a rectangular prismatic connection body. Feed ducts in the interior of the valves and controlled fluid ducts are connected with feed ducts and load ducts running through the connection body. The same are connected with distribution ducts which are formed in a manifold body which is also mounted on the connection body. The valves have venting ducts which are connected with a common spent air ducts formed in the spent air duct body. Furthermore, the valve have electrical connectors which are connected with a common electronic circuit board.

6 Claims, 8 Drawing Sheets

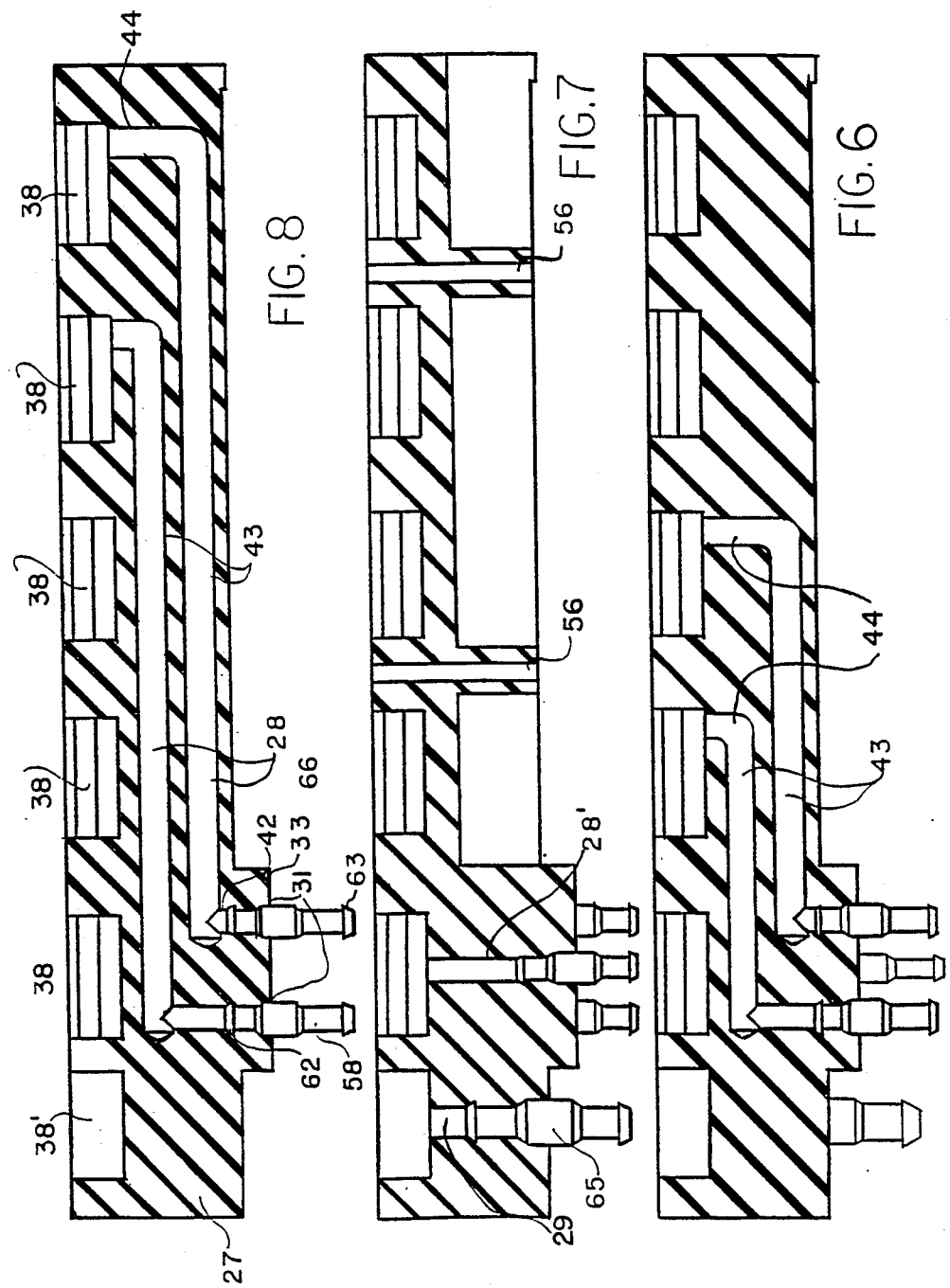

VALVE ARRAY

CROSS REFERENCE TO RELATED APPLICATIONS

This is a continuation of application Ser. No. 124,380 filed Nov. 24, 1987 which is a File Wrapper Continuation of application Ser. No. 885,942 filed July 15, 1986, now abandoned.

FIELD OF THE INVENTION

The invention relates to a valve array comprising a plurality of solenoid valves with each solenoid valve having at least one internal valve supply duct. The ducts are arranged to open at one common connection side of the valve. The valves are each provided with at least one venting duct opening at a venting side of the valve and with electrical connector members, such as contact lugs on an actuating side of the valve for the supply of an electrical valve driving signal to the valve.

BACKGROUND OF THE INVENTION

Valves used in such valve arrays have already been proposed in a large number of different designs. These prior arrangements possess internal reciprocating valve members. The valve members are either in an open position to produce a connection between the valve supply duct and the controlled flow duct, of which there is at least one, or in a closed position to interrupt the connection. Normally the controlled flow duct of the valve is vented in the closed position by way of the venting duct which opens indirectly or directly into the surroundings. The operation of the valve is normally by way of a solenoid device also arranged within the valve. The solenoid devices are supplied with actuating signals via the electrical connector members. Valves of this sort are for example in the form of 3-2 way valves.

Hydraulically or pneumatically operated equipment normally requires a multiplicity of valves for control purposes. The valves are usually placed together in subassemblies. A multiple valve arrangement makes it possible for the entire control unit of a device or machine to be centralized so that there is a synoptic view of the different elements. This provides a convenient unit for checking the operation of the valves or undertaking maintenance work thereon. The individual valve arrays then comprise valves attached to suitable mounts so that the above-noted ducts may be joined to separate pressure fluid lines or directly with the surroundings in the case of the venting duct. The individual electrical connectors are joined to electrical leads. Such an arrangement has involved a relatively high requirement for space due to need for the pressure fluid leads to be laid without sharp bends. Even so the lack of space is likely to cause pressure fluid leads to slip off the connections so that the supply with fluid under pressure is interrupted. A further source of trouble results from the large number of electrical connection leads, as during assembly they may be easily and frequently confused. Even the blowing off of spent air into the immediate surroundings of the valve array is troublesome, since this air frequently contains oil mist and will quickly foul the adjacent part. If such oil-laden air reaches the electrical circuitry creep currents may result and the wrong valves may be actuated. In consequence valve arrays of the initially mentioned type are relatively bulky and liable to fail and, furthermore, assembly is an elaborate operation.

SUMMARY OF THE INVENTION

The above discussed problems are solved by providing a single valve assembly which includes a plurality of substantially rectangular block-shaped valve bodies with each valve body having a planar venting side at one end, a planar connection side at an opposite end and a planar operating side between the venting side and the connection side. Each of the valve bodies has at least one feed duct, at least one vent duct and at least one control fluid duct defined within the valve body. A connection member is provided having a planar mounting surface connected to each of the valve bodies' connection side and positioning said valve bodies with the valve body operating sides all oriented in the same direction along a substantially common plane. The connection member includes a planar assembly side at substantially right angles to the mounting surface. A plurality of load ducts are provided in the connection member. Each of the plurality of load ducts is connected to a respective one of said control fluid ducts and each of the plurality of load ducts includes a duct section extending to the assembly side. A supply duct is provided in the connecting member communicating with each of the feed ducts. The supply ducts open into the assembly side. A manifold body is provided having a planar manifold base mounted on the assembly side. A plurality of distributor ducts are provided each extending substantially parallel to the assembly side in the manifold body with each being connected to a corresponding one of the duct sections. The manifold body is provided with a plurality of consumer orifices connected to the distributor ducts. The consumer orifices project out of the manifold and include port openings defining plug connections.

With this arrangement, the valve array may be provided with an electrical system shared by all the valves and the electrical connections may be produced by the attachment of a single electronic circuit board. Confusion of connections is eliminated. The assembly time for making the electrical connections may be substantially reduced. There is a concomitant acceleration of the overall assembly process, inasmuch as the fitting of the valves to the connection member, simultaneously entails the connection with the loads and with a pressure fluid supply and a receiver for spent fluid. The use of the inventive manifold body speeds assembly as the connection member is simultaneously connected with a number of duct connections.

Owing to the presence of the manifold body it is also possible to dispense with the placement of the pressure fluid ducts in the immediate neighborhood of the valve array so that a number of valve arrays may be mounted close together and very compactly. It will be clear that the valve array of the present invention may be produced at a very favorable price. Owing to the bleeding off of the air from the venting ducts into a common spent air duct, it is furthermore possible to prevent contamination of the immediate environment. Additionally, it is possible to connect a single muffler with the central spent air duct, at a low price, in order to reduce the amount of noise coming from the array. As a further advantage, for distribution of the fluid under pressure to the individual valves, it is not necessary to have a separate pipe leading to each valve. By the inventive arrangement it is possible to have a central fluid distribution means with one single fluid inlet connection.

The connection of the electronic circuit board, and of the spent air manifold body, may be effected simply by plugging them in place at the required position. Furthermore, the connection of the fluid ducts to the valve body is much quicker and less liable to be confusing when making changes in the valve array of the invention. It is in fact possible for the separate orifices of the manifold ducts of the manifold body to be arranged in a very small space so that a central multi-pole or duct plug may be connected, which is connected with the pressure fluid ducts leading to the different loads. When servicing is necessary it is possible for the loads to be connected and disconnected in an instant, all the loads being affected at the same time with an advantageous effect.

Accordingly, it is an object of the invention to provide a valve array which is simpler in arrangement than prior art arrays, rugged in construction and economical to manufacture.

A further object of the invention is to provide a valve array formed of individual units which may be rapidly assembled in a dependable manner.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

FIG. 6 is a partial cross-sectional view taken in the direction of line 6—6 of FIG. 2, showing distribution ducts and tubular connectors plugged into the distribution ducts;

FIG. 7 is a cross-sectional view taken in the direction of line 7—7 of FIG. 2, showing distribution ducts and tubular connectors plugged into the distribution ducts;

FIG. 8 is a cross-sectional view taken in the direction of line 8—8 of FIG. 2;

DESCRIPTION OF THE PREFERRED EMBODIMENTS

Figure 1:
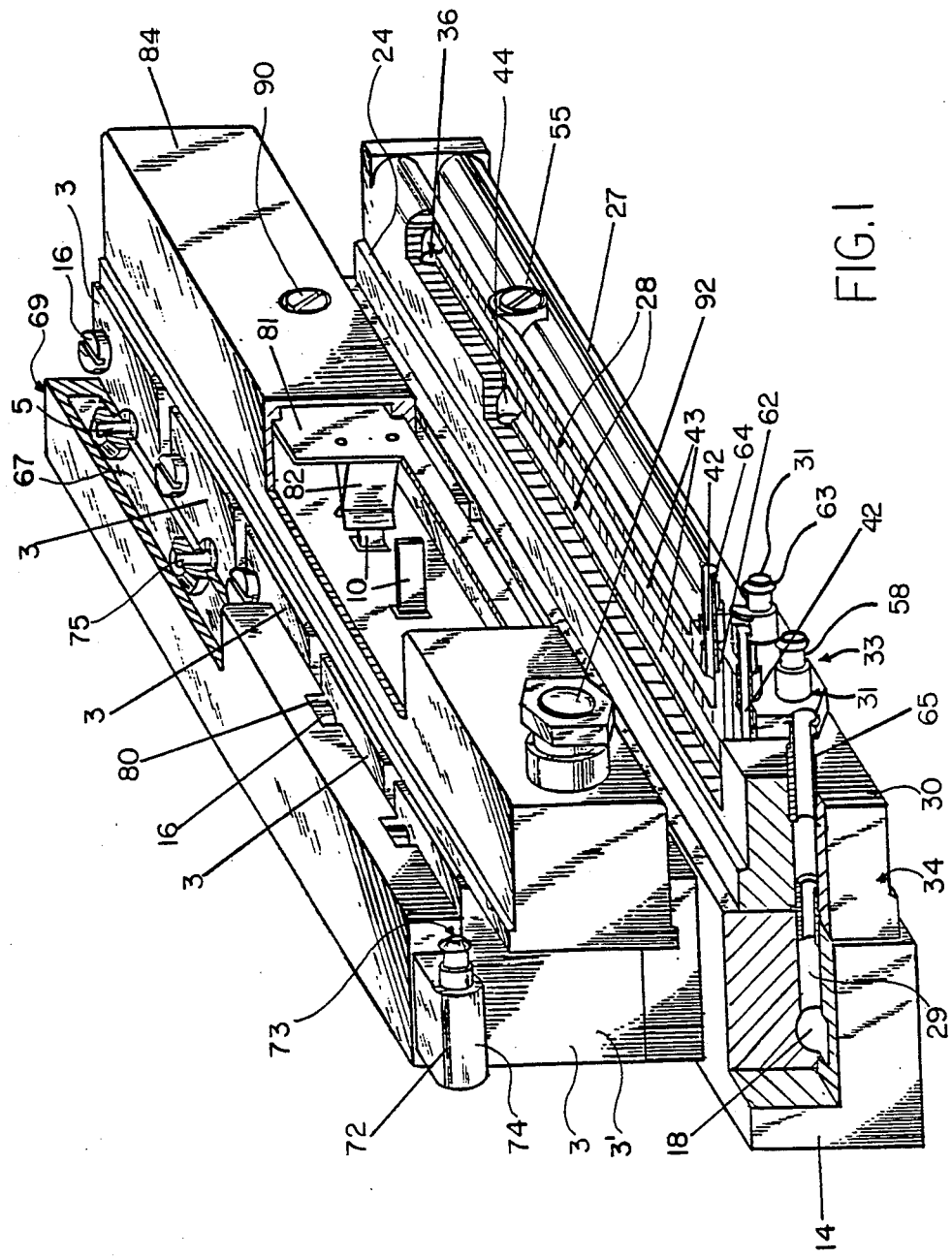
FIG. 1 is a perspective view of a valve array according to the invention.

Referring to the drawings in particular, the invention embodied therein comprises a valve assembly including a plurality of substantially rectangular block-shaped valve bodies 3. As seen in FIG. 5, each of the rectangular block-shaped valve bodies 3 has a planar venting side 4 at one end and a planar connection side 8 at an opposite end. Each of the plurality of valve bodies includes a planar operating side 12 between the venting side and the connection side. Each valve body includes at least one feed duct 6, at least one venting duct 5 and at least one control fluid duct 7. A connection member 14 is provided having a planar mounting surface 13 connected to each of the valve bodies 3 connection side 8 such that each of the valve bodies 3 is positioned with the operating sides 12 all oriented in the same direction along a substantially common plane. The connection member 14 has a planar assembly side 24 at substantially right angles to the mounting surface 13. A plurality of load ducts 23 are provided in the connection member (see FIGS. 9 and 5). Each of the plurality of load ducts 23 is connected to a corresponding respective one of the control fluid ducts 7. Each of the plurality of load ducts 23 has a duct section 26 extending to the assembly side 24. A supply duct 18 is provided in the connection member 14 communicating with each of the feed ducts 6 and opening into the assembly side 24. As seen in FIGS. 5 through 8, the manifold body 27 is provided having a planar manifold base mounted on the assembly side 24. A plurality of distribution ducts 28 (see FIGS. 6, 7 and 8) are provided within the manifold body extending substantially parallel to the assembly side 24. Each of the distribution ducts 28 is connected to a corresponding one of the duct sections 26. The manifold body 27 is provided with a plurality of consumer orifices 31 connected to the distribution ducts 28. A plurality of plug connections 58 (FIG. 4) are provided in the consumer orifices 31 connected to the distribution ducts 28. A plurality of plug connections 58 are provided within the consumer orifices 31 projecting out of the manifold body 27.

As best seen in FIG. 5, each of the valve bodies 3 are formed as block-shaped members defining planar sides. As discussed above, these sides include a planar venting side 4, a planar connection side 8 and an operating side 12. Each of the valve bodies 3 include a valve actuation device 9 in the form of a annular magnet arrangement. A lifting member 101 is positioned coaxial with respect to the actuation unit 9. The lifter 101 is movably disposed within the actuation mechanism in a central opening 100. The valve lifting member 101 is preloaded by means of a spring 102 which biases the lifting member 101 downwardly (closed position). In the closed position, lifting member 101 lies such that its lowermost face contacts the opening of the valve feed duct 6. The valve feed duct 6 is tightly sealed in the closed position by means of sealing element 103. The valve lifting member 101 is provided with a coaxial groove 104 through which control fluid duct 7 is connected to the vent duct 5 in the closed position. The magnet actuation device 9 is connected to two contact lugs 10 via electric conductor 105. When the magnet arrangement is activated by feeding an electrical activation signal, the valve lifting member 101 is moved upward against the tension of spring 102 so that the valve feed duct 6 is opened. The valve lifter 101 is made from material which reacts to the magnetic field of the magnetic arrangement, preferably made from a ferromagnetic material. The valve lifting member 101 is then in an open position, after it is lifted from the valve feed duct 6. In the open position, the front side of the valve lifting member 101 faces the spent air duct body 68 which covers the vent duct 5. A sealing element 106 is provided at an end of the lifting member 101 to seal the vent duct 5. In the open position, the feed duct 6 is connected to the control fluid duct 7.

Figure 9:
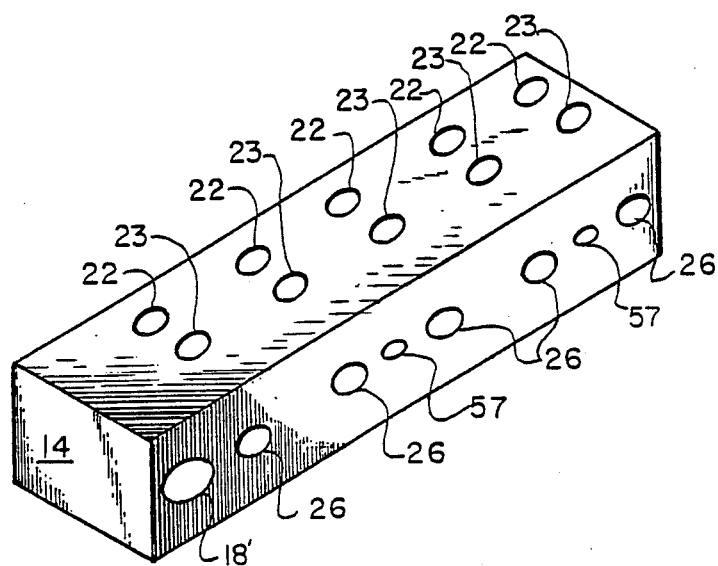
FIG. 9 is a perspective view of a connection member of the valve array according to the invention.

As seen in FIGS. 5 and 9, the connection member 14 has a planar mounting surface 13 connected to each of the valve bodies' 3 connection side. The connection member 14 allows the positioning of the valve bodies with their operating sides all oriented in the same direction along a substantially common plane. The connection member 14 defines the supply duct 18 which runs along a portion of the length of the connection member 14. The supply duct 18 is connected to the feed duct 6 of the valve members by supply branch ducts 22. It is possible to employ seals between the connection surface 8 and the mounting surface 13 of the valves and the connection member respectively. It is especially advantageous to have the supply branch ducts 22 be coaxial with the feed duct 6 with each having a central axis which is perpendicular to the mounting surface 13 and the connection side respectively. It is noted that the cross section of the common supply duct 18 is larger so as to allow a higher fluid flow rate than the separate supply branch ducts 22.

Figure 2:
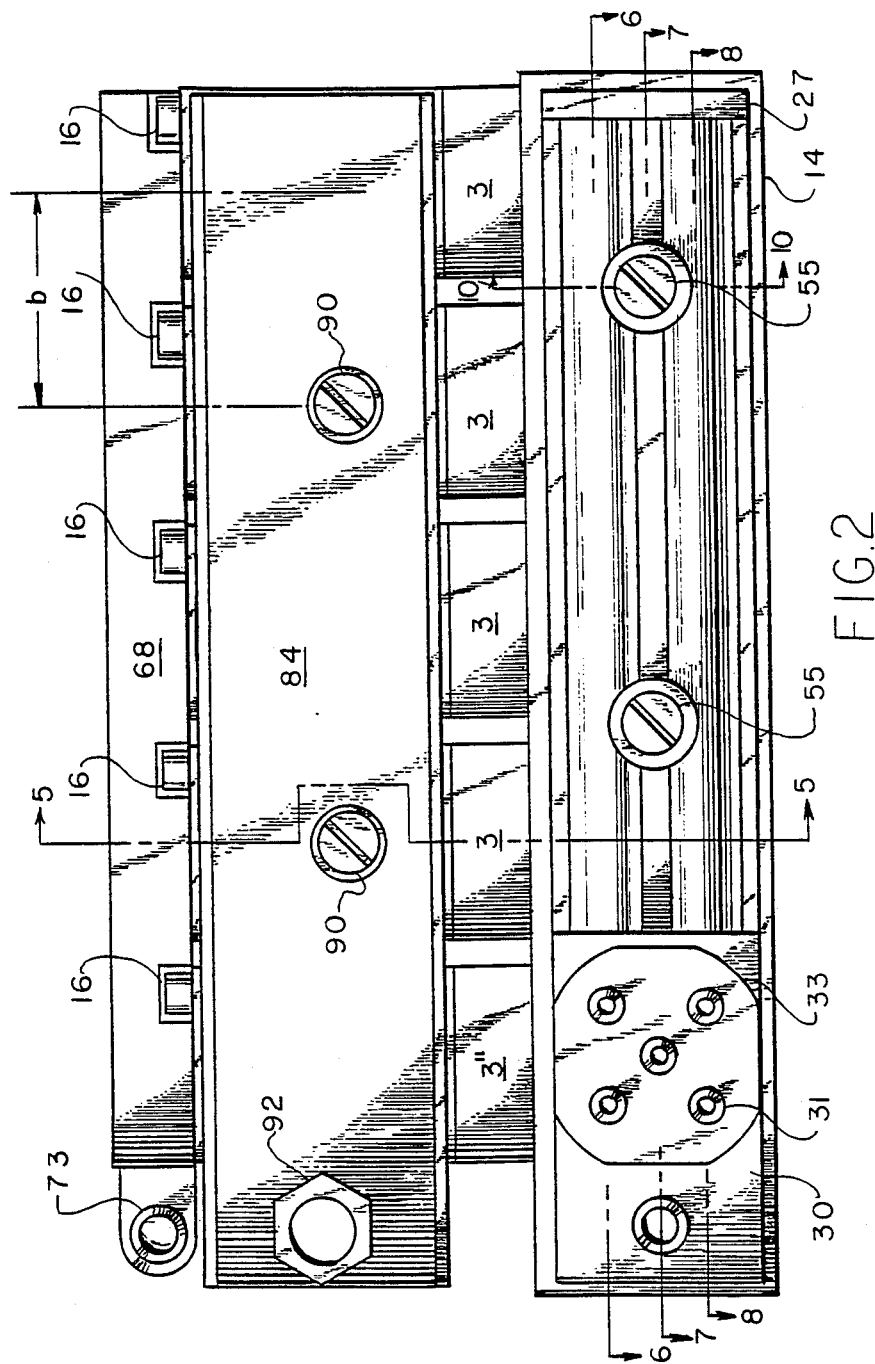
FIG. 2 is a front view of the valve array according to FIG. 1.

The breadth of the connection member 14 is only slightly larger than that of each valve 3, the valves 3 being arranged in a row with the length direction of this valve row being parallel to the length direction 15 of the connection member 14. To save space it is possible for the valves to be placed immediately adjacent to each other, yet for improved handling it is preferable, as shown in FIG. 2, to leave a certain gap with a width "a" between one valve and the next. The attachment of the valves 3 to the connection member 14 is by means of attachment screws 16, which extend through the respective valve from the venting side 4 to screw into respective tapped holes 17, which extend as blind holes from the mounting surface 13 into the connection member 14. For each valve there are two such attachment screws 16, which as seen in plan in FIG. 2 are located in diagonally opposite corners of each valve.

All the valve feed ducts 6 communicate with a common supply duct 18 in the interior of the connection chamber 14 running parallel to the length direction 15 of the connection member. For the connection of each valve 3, a supply branch duct 22 in the connection member 14 at the one end opens into the supply duct 18, and at the other end opens at the mounting surface 13, where it is directly connected with the preferably coaxial valve feed duct 6 (see FIGS. 5 and 9). The cross section of the common supply duct 18 is larger, owing to the higher fluid flow rate, than the separate supply branch ducts 22.

The supply duct 18 extends practically along the full length of the row of valves of the valve array. At one end it is closed whereas at the other end it opens at on of the sides of the connection member 14 at a position where it is connected with fluid under pressure, as for example compressed air.

At the interface between the connection surface 8 and the mounting surface 13 the controlled fluid ducts 7 of the valves 3 are connected with load ducts 23, also formed in the interior of the connection member 14. Such connections between the ducts 23 and the ducts 7 may be furnished with a seal. The ducts 23 open at their other ends at a common assembly side 24 of the connection member 14 (on one of its long sides). The assembly side 24 is preferably one of the two long sides directly adjacent to the mounting surface 13, and in FIG. 5 it will be seen that it is the surface facing the same way as the operating side 12 of the valves 3.

Each of the load ducts 23 have two sections, a first load duct section 25 extends from the controlled fluid duct 7 towards the interior of the connection member 14 and a second load duct section 26 which extends from the interior of the connection member 14 towards the assembly side 24. The connector ducts 23 each having, that is to say first branch 25 which extends at a right angle towards the assembly side 24 in which it opens. The supply duct 18 preferably also opens at the assembly side 24, to provide a central supply and removal of fluid. For this purpose the supply duct 18 has a further supply duct 18' extending parallel to the second duct sections 26, providing a connection with the assembly side 24. This duct is not shown in FIG. 5 as it is in a plane not coinciding with the plane of line 5—5, however the further supply duct 18' can be seen in FIG. 9.

The various ducts are best produced by drilling in the connection member or they may be formed by casting the member 14.

A manifold body 27 is detachably secured to the assembly side 24 of the connection member 14. The manifold body 27 has internal distribution ducts 28 communicating with the load ducts at the assembly side 24, and a supply duct 29 which is also internal and is joined with the supply duct 18'. These ducts 28 and 29 extend through the manifold body 27 and have their ends opposite to the assembly side 24 opening in a central arrangement. A small distance is provided between the duct ends at a duct side 30 of the manifold body 27, where the duct ends may be connected with other pressure ducts leading to other instrumentalities. The manifold body 27 thus has the purpose of arranging the connection points for the pressure fluid ducts compactly so that the connection of the pressure fluid lines or ducts may take place at a central point. Accordingly the lengths of the pressure fluid lines will not be excessive and the arrangement will be more readily seen and understood at a single glance. The connection of pressure fluid ducts with the ducts of the respective load is facilitated if the duct side 30, having the duct orifices faces away from the connection 14 (see FIG. 1). The frontal arrangement of the duct side 30 will make the system straightforward to inspect visually.

Figure 3:
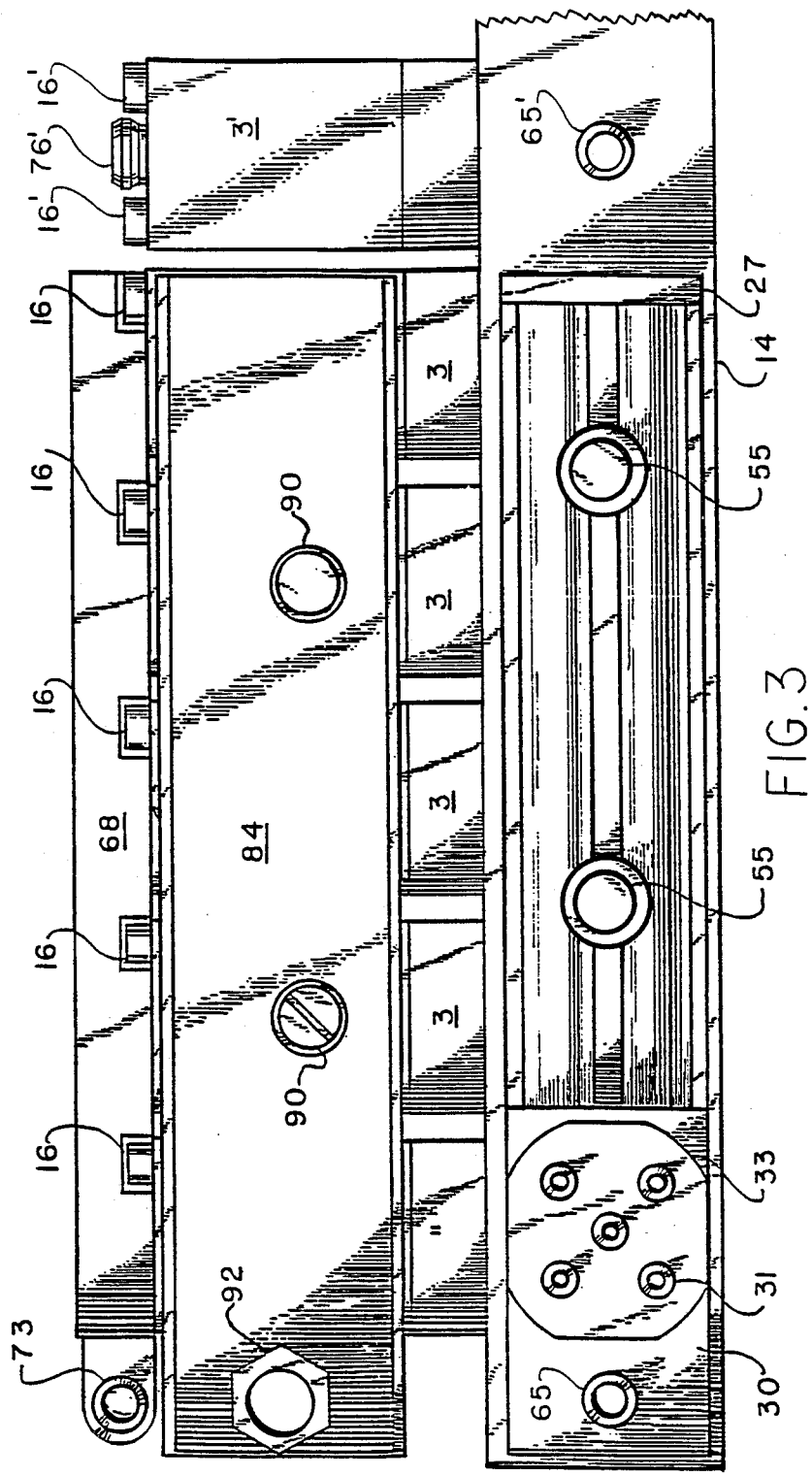
FIG. 3 is a front view similar to FIG. 2 showing a variation of the valve array with an additional valve.

The manifold body 27 has generally the form of a rectangular prism with a length about equal to the length of the row of valves 3. One of the long sides of the manifold body 27 rests on the assembly side 24. The height of the manifold body 27 as measured in the height direction of the valves is preferably about the same as the height of the connection member 14 or, as in the present embodiment, may be somewhat less than it. Furthermore, the length of the manifold body 27 is about equal to that of the connection member 14. This does however not have to be so and in FIG. 2 and FIG. 4 the connection member 14 is longer than the manifold body 27, the latter being associated with the five valves 3 shown in the example. As will be seen from FIG. 3, it is however possible for such a further valve 3' to be affixed to the longer connection member 14, and such valves may possibly be connected without a manifold bar to a load and directly via the load duct orifices 32 arranged on the assembly side 24. The valve 3' can advantageously be supplied via the common supply duct 18. However, the valve 3' may be included in the valve array as well, or it may form a further valve array with further valves that are also present.

The orifices 31, placed on the common duct side 30 of the distribution ducts 28 are preferably collected together very compactly, and with a small spacing between them, in a connection unit 33 like a wall socket. This unit 33 is placed at the end 34 on one long side of the manifold body 27 and in the front view of FIG. 1 it will be seen to be below the first valve 3″ of the valve row in the front view of FIG. 7 while in the plan view of FIG. 4 it will appear in front of such first valve 3″.

In what follows an account will be given of the configuration of the ducts in the manifold body 27. The five distribution ducts 28, equal in number to the number of valves, open at the manifold body side 35 turned toward the assembly side 24 so as to be each generally downstream from one of the orifices 36 of the load ducts 23. The load ducts are placed spaced apart in a linear row with the direction of the row being parallel to the valve row and the connection member 14. Since the two load duct sections 25 and 26 are arranged in a common plane, the orifices 36, as seen in the front view of FIG. 1 will also be directly under the respective valves 3 (not shown).

The load ducts 26 are spaced at regular intervals in order to facilitate assembly (the spacing is the same as the center distance b of the valves 3—FIG. 2). It is not necessary for the orifices 36 to be each placed in the central valve plane and it would be possible to have a one-sided arrangement. Furthermore, the orifice of the supply duct 18 is in the same row of orifices (see FIG. 9)

The distribution duct 28′ leading to the orifice 36 of the load duct 23 for the first valve 3″ of the valve or valves 3 extends linearly through the manifold or distribution body 27, transversely in relation to the longitudinal direction of the manifold body so that it is arranged coaxially to the second duct section 26 of the load duct 23. The other remaining distribution ducts are stepped or angled and are generally divided up into three sections. There is a first duct section 42 adjoining the orifices 31 at the duct side 30 and running at a right angle to the duct side 30 so as to be at a right angle to the length direction of the manifold body 27 and to extend some distance into it without extending through it. After this section there is a second duct section 43 running in the length direction of the manifold body. This section 43 is continued in the form of a third duct section 44 extending at a right angle to the assembly side 24. The duct section 44 adjoins a receiving chamber 38. The receiving chamber 38 is on the manifold body side 35 of the manifold body 27, opposite the common duct side. The three duct sections 42, 43 and 44 are in a common plane parallel to the mounting surface 13.

In order to avoid intersection of the distribution ducts 28 in the manifold body 27, the manner of arrangement of the distribution ducts in relation to each other is selected as follows (see FIGS. 2, 6, 7 and 8):

The orifices 31 on the common duct side 30 adjacent to the ducts are arranged in a quincunx with the orifice at the straight duct 28′ at the center thereof. Two opposite sides of the quincunx are parallel to the length direction of the manifold body 27 so that the form of the connection unit 33 of FIG. 2 will result. As best shown in FIGS. 6, 7 and 8, the distribution ducts 28 placed in a common plane parallel to the mounting surface 13 have first duct sections 42 of different length so that the adjoining second duct sections 43 are parallel and adjacent to each other. As viewed in cross section (see FIGS. 4 and 10), the two duct sections are at the corner of a rectangle. It will be clear that the second duct sections 43 on each plane parallel to the mounting surface 13, are not of the same length, one ending before the other, wherein the third duct section 44 is connected. The arrangement of the individual distribution ducts 28 in relation to respective valves 3 is unimportant, but it will be clear that the second duct section 43, which is respectively nearer to the connection member 14, of the distribution ducts arranged in a common horizontal plane, will be shorter than the further removed second duct section of the other distribution duct so that there is no possibility of intersections.

The supply duct 29 is directly adjacent to the connection unit 33, extending through the manifold body 27 in a straight line and communicating with the supply duct 18′.

The load ducts 23, the supply duct 18 and the distribution ducts 28 and furthermore the feed duct 29 have their orifices arranged in the interfaces between the connection member 14 and the manifold body 27. The interfaces are provided with a widening cross section 46 and 47 to receive a tubular gasket sleeve 48 made of a material with rubber-like properties to connect the two bodies together. This gasket sleeve prevents leaks at the interface. The diameter of the bore 49 through the gasket sleeve is generally the same as the rated diameter of the ducts in their parts which are not widened as aforesaid and such widened cross sections in fact permit the use of a relatively large external diameter of the gasket sleeves 48 without producing a choke or bottle-neck in the bore 49 of the gasket sleeve, which might have undesired effects on the flow of the driving fluid. In order to insure that the gasket sleeves 48 are not unintentionally maneuvered fully into one of the widened cross sections and fail to seal, generally half way between their ends, the gasket sleeves 48 are provided with a circumferential flange 50 which at the orifice 45 of the duct section engages the assembly side 24 and a lid portion 54 of the manifold body 27 opposite the assembly side 24. All the flanges 50 of the gasket sleeves 48 employed may, in accordance with a further working example of the invention (not illustrated), be joined together so as to form a sort of connected or supporting web for the gasket sleeves in order to facilitate and expedite assembly operations.

Directly at each of the separate orifices 45 there is, in the interior of the manifold body 27, the separate receiving chamber 38 as already noted (see FIG. 5). This chamber constitutes a further widening of the cross section into which the end part of the gasket sleeve 48 projects. The gasket sleeve being further gripped and locked by a retainer flange 52 on the gasket sleeve held by the lid portion 34. The gasket sleeve is accordingly firmly anchored in the manifold body 27.

Each receiving chamber 38 also serves as a fluid passage. The orifices 45 of the gasket sleeves 48 are in a different horizontal plane from the three duct sections 42, 43 and 44 of the respective distribution ducts 28. Since both the third duct section 44 and also the orifice 45 of each gasket sleeve 48 is in communication with the respective receiving chamber 38, the flow of fluid is able to take place as desired.

Figure 11:
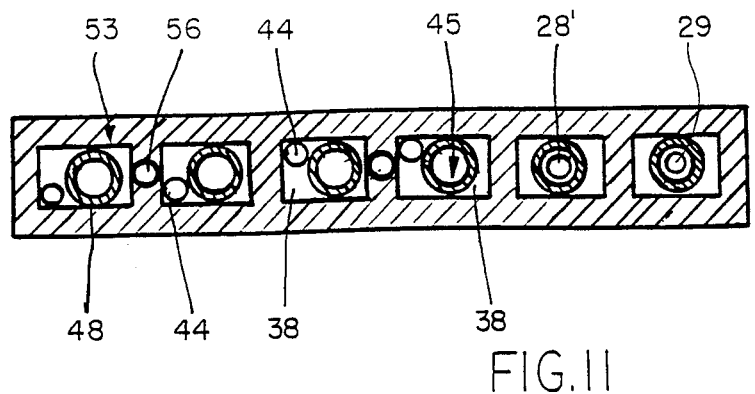
FIG. 11 is a cross-sectional view taken in the direction of line 11—11 of FIG. 4.

This will be shown once again in more detail in FIG. 11 from which it will be seen that the receiving chambers 38 have a generally rectangular cross section and their wall faces 53 surround both the duct section 44 opening into them and also the orifice 45. Accordingly the fluid is able to enter via the gasket sleeves 48 and the orifice 45 into the receiving chamber 38 which it leaves through the third duct section 44 leading into the orifices 31 on the duct side.

For the sake of simplicity, the feed and distribution ducts 29 and 28' extending straight through the manifold body 27 are provided with receiving chambers 38 of the type described. However, since the direction of the flow does not have to be changed, it is possible to do without these receiving chambers.

To simplify production methods the receiving chambers 38 are made by providing large recesses extending into the manifold body 27. Each of these recesses are then shut off with the lid 54. Each lid is provided with a hole through which the end part of the gasket sleeves 48 project. This arrangement allows fluid from the respective load duct to flow into the recess 38 via the respective duct section and bore. This lid is then best bonded to the manifold body 27 and let into the manifold body to some degree in order to allow for the thickness of the flanges 50.

Figure 10:
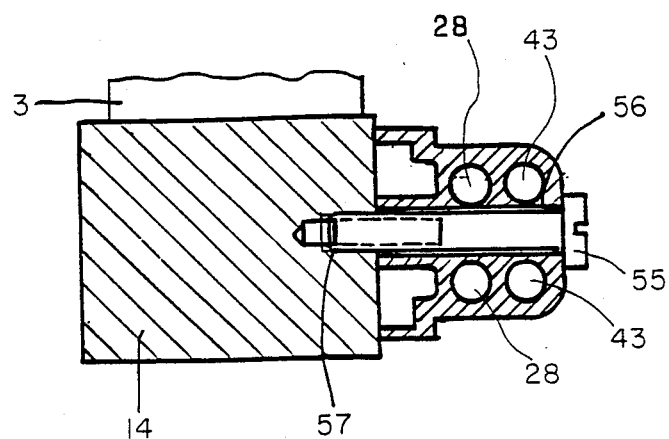
FIG. 10 is a cross-sectional view taken in the direction of line 10—10 of FIG. 2.

The manifold body 27 is detachably connected with the connection member 14 by two screws 55 as best shown in FIGS. 2, 7 and 10 which extend through holes 56 extending parallel to the feed duct 29 and are screwed into suitable tapped holes 57 in connection member 14. In order to keep clear of the distribution ducts or the receiving chambers, the through holes 56 are arranged to run through between the upper and the lower distribution ducts and between each two adjacent receiving chambers 38 in the manifold body.

A tubular connector 58 (see FIGS. 4, 6, 7 and 8)is plugged into each of the distribution ducts 28 from the orifices 31 in the duct side. This connector 58 has an annular coned bead 62 and 63 on its plugged-in end and also on its opposite free end 64 respectively. The beads 62 inserted into the manifold body become hooked into the manifold body which at least here is made of soft material so that the connectors are reliably held in place and there is also an efficient sealing effect. Pressure hoses may be connected with the free ends 64 of the tubular connectors and held in place in the same manner as on the sleeves. A similar connection sleeve 65 is also advantageously plugged into the feed duct 29.

There is the advantage in this connection that the pressure lines or ducts to be connected may be grouped together in a single "multipole" pneumatic equipment plug (not shown) which will have female sockets complementary to the arrangement of the tubular connectors 58 and may be detachably joined up with the connection unit 33. This makes possible an instant connection so that assembly time is reduced. It is then best for this plug to be provided with a flange (not shown) on its side adjacent to the connection unit 33. This flange will then be able to be slipped over a wide part 66 of the duct side, this being a certain way of preventing the connection means from being pulled off. It is naturally also possible for this plug to be provided with a means for connection with the tubular connector 65.

All the venting ducts 5 of the valves of the valve array are joined with a common spent air duct 67 (see FIG. 4), which is formed in a spent air duct body 68 detachably mounted on the valves 3 on their venting sides 4 and extends over the valves 3 like a bar. This body 68 has a generally rectangular cross section and the spent air duct 67 is arranged centrally in it, and extends through it in the length direction and possesses a rectangular flow cross section. The spent air duct 67 is shut off at one of the ends 69 of the spent air duct body 68, while its other end is open and possesses a socket 70 (FIGS. 2 and 4), into which the male member 71 (having a matching cross section) of a pneumatic connection plug 72 may be inserted and, preferably, secured by bonding At its other end the plug 72 has a male projection 74 designed like the connection ends 64 of the connection sleeves. For connection with the spent air duct 67 the projection 74 may have a spent air duct (not illustrated) slipped onto it. The connection is by way of a passage 73 through the plug. To facilitate handling, the plug projection 74 faces the same way as the connection sleeve 58 on the manifold body, for which purpose it is angled.

Figure 4:
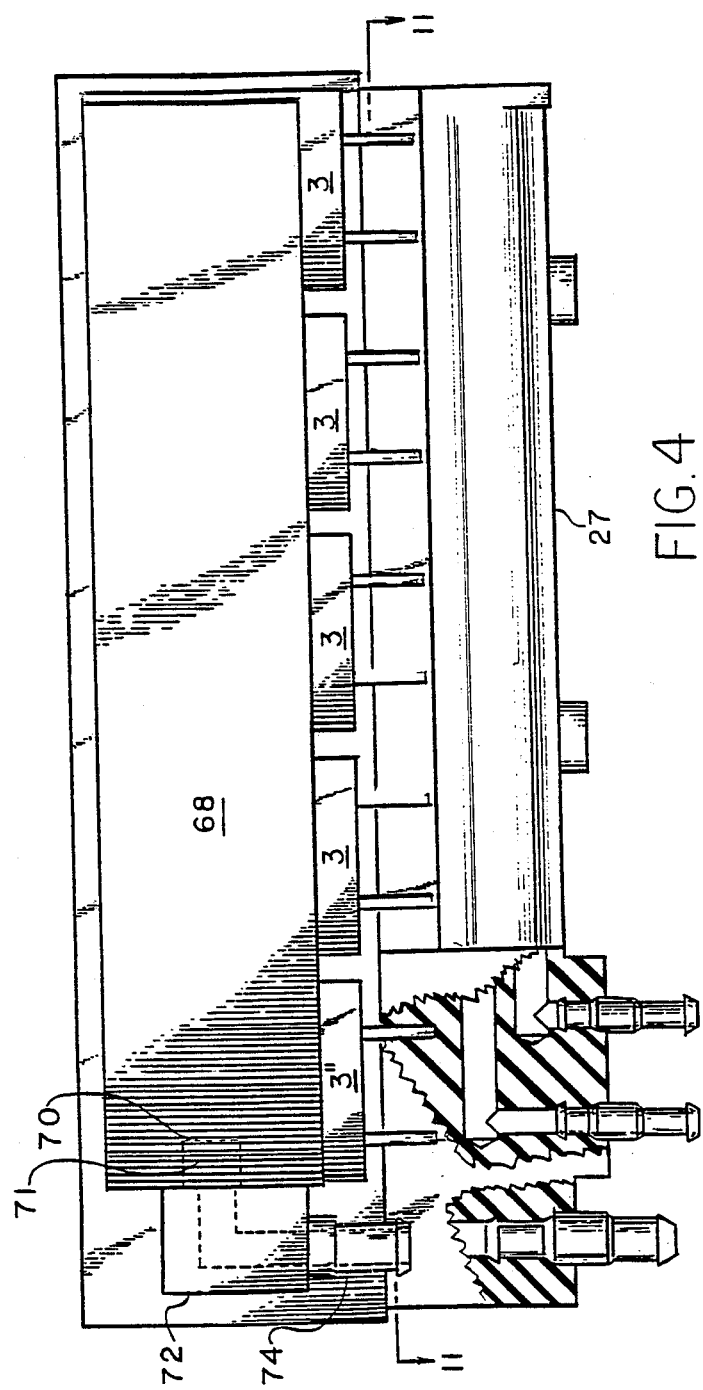
FIG. 4 is a top partial sectional view of the valve array according to FIG. 1.
Figure 5:
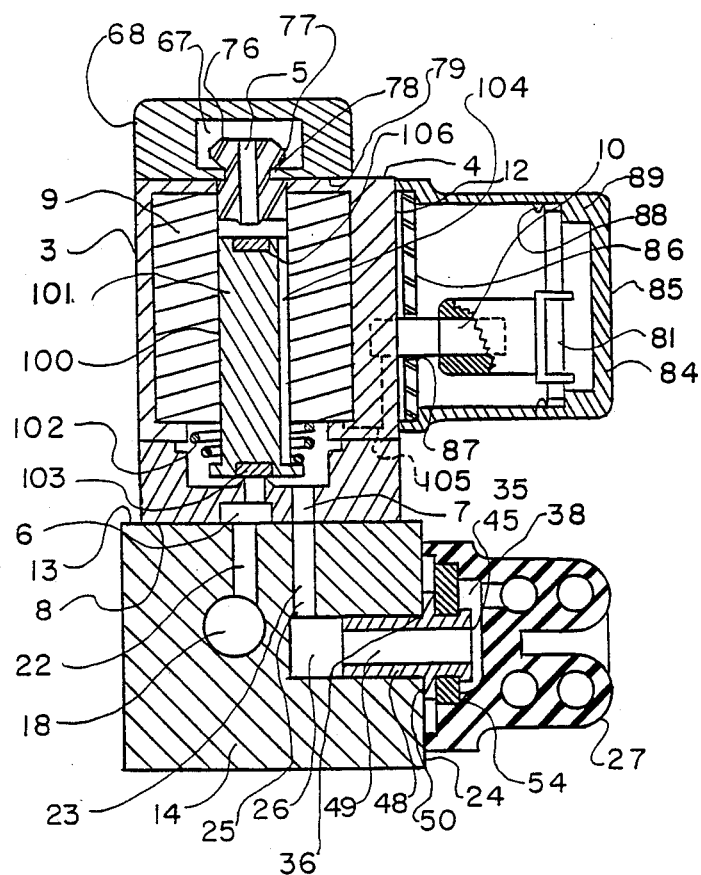
FIG. 5 is a cross-sectional view taken in the direction of line 5—5 of FIG. 2, showing distribution ducts, and tubular connectors plugged into the distribution ducts.

As best shown in FIG. 4, on its venting side 4 every valve 3 has a connection sleeve 76 in, or at the orifice of, the venting duct. The sleeve 76 extends clear of the venting side 4 and has an external bead 77 at its free end. The connection sleeves of all the valves are aligned in a row. The spent air duct body 68, which is best made of a material with properties like those of rubber, is provided with spent air branch ducts 78, which at one end open at the plug-on side, facing toward the venting side 4, of the spent air duct body, and at the other end are in communication with the spent air duct 67. The number of these ducts is the same as the number of venting ducts 5. Furthermore these ducts, as viewed in the length direction of the spent air duct body 68, will be seen to be spaced out by distances equal to the spacing of the plug-in sleeves. The diameter of the spent air branch ducts 78 is the same as the rated external diameter of the connection sleeves 76 and their length as measured between the orifices, on the plug-on side 79 and at the spent air duct 67, is equal to the distance between the plug-in side 4 and the commencement of the external bead 77 on the respective connection sleeve 76. All these features contribute to making it possible for the spent air duct body 68 to be detachably slipped onto the connection sleeves 76 on the spent air side 4, so that when it is slipped on, as shown, the circumferential beads 77 of the connection sleeves 76 extend into the common spent air duct 67. The body 68 is then "plugged onto" the connection sleeves 76.

The spent air duct body 68 therefore makes it possible for the spent air from all the valves to be led away through a common collecting duct and, if desired, ducts connected therewith. It is convenient if a muffler is connected, directly or otherwise, downstream from the connection plug 72 in order to reduce the amount of noise produced. It is then sufficient to employ a single muffler and this substantially decreases costs.

It is furthermore to be pointed out that the spent air duct body has screw head sockets 80, in its plug-on side 79, in a pattern the same as the arrangement of the attachment screws 16, so as to receive the heads of the attachment screws 16 when the spent air duct body 68 is plugged on so that it will rest on the top sides of the valves over a large area. This reduces the overall height.

As already mentioned, the operation sides 12 of the valves 3 are all facing in the same direction and, as seen in the length direction 15 of the connection body 14 and in plan, are turned towards the manifold body 27. The contact lugs 10 (see FIGS. 1 and 4) fixed thereto are connected with an electronic circuit board 81, common to all the valves, by plug means. The board is directly opposite to the operating side 12 and parallel thereto and has second connectors 82, complementary to the contact lugs 10, in the form of female lugs 83 so that one simple motion of the hand will suffice to fit the electronic circuit board on the valves and to remove it therefrom. The electronic circuit board will be provided with printed wiring, not shown, which is connected with the female lugs 83 with connection leads, not illustrated, leading to an electronic controller. To prevent damage and soiling, the electronic circuit board 81 is completely within a guard housing 84 with a rectangular cross section. The housing 84 comprises a generally trough-like section 85, whose opening is turned towards the valves and which is closed by a lid 86. The electronic circuit board 81 is placed in the floor part, running parallel to the operating side 12, of the housing section 85, whereas the female lugs 83 extend from it towards the lid 86. Directly opposite to the female lugs 83, the lid 86 has openings 87 through which the contact lugs 10 extend into the interior of the guard housing 84 in which they are plugged into the female lugs 83. It is preferred for both the lid 86 and also the electronic circuit board 81 to be detachable from the guard housing 84, as for example by using clip or other detent fasteners. In the corner part of the transition between the floor and the side walls of the housing section 85 there are small molded-on rests 89 in front of which there are heads 88, molded on the side walls at a small distance from the valves. The electronic circuit board 81 is detachably clipped between the heads 88 and the rests 89.

As more particularly shown in FIG. 2, it is possible for the guard housing 84 carrying the electronic board 81 to be additionally anchored by means of screws 90 on the valves 3 which for this purpose have respective tapped holes 91 in their operating sides 12 between the two contact lugs. Furthermore, the guard housing has a cable opening 92 in its floor turned away from the valve so that electrical leads may be introduced into the guard housing to lead to the electronic circuit board 81.

As will be seen from FIG. 1, the connection plug 72 of the spent air duct body 68 and the cable opening are arranged in that end part of the valve arrangement which also has the connection unit 33. As a result it is possible for all connections, both electrical and pneumatic, to be made centrally.

ASSEMBLY

The main components of the valve array are assembled as follows:

The connection member 14 is manufactured by a machining operation or casting operation. Each valve 3 is secured to the connection member 14 oriented in the same direction. The feed ducts 6 are lined up with supply ducts 22 and the control ducts 7 are lined up with the load ducts 23. The air duct body is fitted over the external beads 77 at the venting side 4. The gasket sleeve 48 is fitted into the second duct section 26 pressing the sealing flange 50 against the assembly side of the connection member 14. The lid 54 is secured in the manifold body 27 leaving a recess 38 between it and the respective distribution duct orifices. The manifold body 27 is connected to the connection member inserting an end of the gasket sleeve 48 through the hole in the lid and securing the lid between the sealing flange on the gasket sleeve and the retaining flange on the sleeve. The guard housing 84 is then secured to the valves electrically connecting the female lugs to the complementary contact lugs 10 of each valve.

After assembly, the valve lifting member 101 may be moved between the open and closed position. When in the open position, a pressure medium supplied by the supply duct 18 can reach the control fluid duct 7 via the valve feed duct 6. In this position, the vent duct 5 is shut. When the valve is switched over and the valve lifting member 101 is in the closed position, the valve feed duct 6 is closed and the control fluid duct 7 is aerated via the groove 104 and the vent duct 5.

While a specific embodiment of the invention has been shown and described in detail to illustrate the application of the principles of the invention, it will be understood that the invention may be embodied otherwise without departing from such principles.

What is claimed is:

1. A valve assembly comprising a plurality of substantially rectangular block-shaped valve bodies each of said plurality of bodies having a planar venting side at one end and a planar connection side at an opposite end, each of said plurality of valve bodies having a planar operating side between said venting side and said connection side, at least one feed duct, at least one vent duct and at least one control fluid duct in said valve bodies extending between adjacent said venting side and adjacent said connection side; a connection member having a planar mounting surface connected to each of said valve bodies connection side and positioning said valve bodies with their operating sides all oriented in the same direction along a substantially common plane, said connection member having a planar assembly side at substantially right angles to said mounting surface; a plurality of load ducts in said connection member, each of said plurality of load ducts being connected to a respective one of said control fluid ducts and each of said plurality of load ducts having a duct section extending to said assembly side; a supply duct in said connecting member communicating with each of said feed ducts and opening into said assembly side; a manifold body having a planar manifold base mounted on said assembly side; a plurality of distributor ducts each extending substantially parallel to said assembly side in said manifold body and each being connected to a corresponding one of said duct sections, said manifold body having a plurality of consumer orifices connected to said distributor ducts and projecting out of said manifold and having port openings defining plug connections.

2. A valve assembly according to claim 1, wherein said valve bodies are arranged in a substantially parallel row, said connection side being parallel to said row and said supply channel runs parallel to the longitudinal axis of said valve bodies.

3. A valve assembly according to claim 1, wherein said supply channel is connected to each of said valve bodies and opens at said assembly side for connection to said manifold body, said manifold having port openings defining consumer plug connections arranged in a straight row in spaced relationships to each other substantially at the spacing between the centers of each of said valve bodies.

4. A valve assembly according to claim 1, wherein said plug connections of said manifold body are arranged in the pattern of a cube with four openings being provided at the corner of said cube and with a fifth opening being provided at the intersection of the diagonals of said cube.

5. A valve assembly according to claim 1, wherein said feed ducts and said control fluid ducts have hollow cylindrical seal port connections made of a rubbery material and arranged in a row on a common support ledge connecting them to one another.

6. A valve assembly according to claim 1, including a solenoid in said valve bodies for operating said valve having a contactable lug portion extending out of said valve body to said operating sides and including an electronic board on said operating side connected to said lugs having a printed circuit, and a protective housing covering said printed circuit.

* * * * *